(12) United States Patent
Rathgeb et al.

(10) Patent No.: US 10,328,766 B2
(45) Date of Patent: Jun. 25, 2019

(54) ROOFTOP-MOUNTED AIR-CONDITIONING INSTALLATION

(71) Applicant: ebm-papst Mulfingen GmbH & Co. KG, Mulfingen (DE)

(72) Inventors: Josef Rathgeb, Jagstzell (DE); Oliver Haaf, Kupferzell (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 15/741,331

(22) PCT Filed: Sep. 20, 2016

(86) PCT No.: PCT/EP2016/072269
§ 371 (c)(1),
(2) Date: Jan. 2, 2018

(87) PCT Pub. No.: WO2017/071880
PCT Pub. Date: May 4, 2017

(65) Prior Publication Data
US 2018/0194193 A1   Jul. 12, 2018

(30) Foreign Application Priority Data

Oct. 30, 2015 (DE) .................. 10 2015 118 557

(51) Int. Cl.
*B60H 1/00* (2006.01)
*B60H 1/32* (2006.01)

(52) U.S. Cl.
CPC ..... *B60H 1/00371* (2013.01); *B60H 1/00471* (2013.01); *B60H 1/3202* (2013.01); *B60H 2001/00235* (2013.01)

(58) Field of Classification Search
CPC ............ B60H 1/00371; B60H 1/00471; B60H 2001/00235; B60H 1/3202
See application file for complete search history.

(56) References Cited

U.S. PATENT DOCUMENTS

| 4,641,502 A | 2/1987 | Aldrich et al. |
| 6,134,909 A | 10/2000 | Lyu |
| 6,161,609 A * | 12/2000 | Ahn .................. B60H 1/00378 165/122 |

FOREIGN PATENT DOCUMENTS

| CA | 2524202 A1 | 11/2004 |
| CN | 205344430 U | 6/2016 |

(Continued)

OTHER PUBLICATIONS

"Centrifugal fans and blowers", Version 7, Oct. 23, 2007, XP055335711, p. 13-56; figures ; URL: http://www.ebmpapst.com/media/content/info-center/downloads_10/catalogs/centrifugal_fans_1/Centrifugal_fans_2007_EN.pdf.

(Continued)

*Primary Examiner* — Ana M Vazquez
(74) *Attorney, Agent, or Firm* — Harness, Dickey & Pierce, P.L.C.

(57) ABSTRACT

A rooftop-mounted air-conditioning installation, in particular for the roof of a bus, has at least having a condenser unit and an evaporator unit. It has an air-flow duct with at least one air intake opening and one air discharge opening. A heat exchanger and a radial fan are arranged in the air-flow duct between the air intake opening and the air discharge opening. An axis of rotation of a fan wheel of the radial fan is oriented parallel to an air flow main direction that extends through the air-flow duct from the at least one air intake opening through the heat exchanger to the radial fan.

13 Claims, 3 Drawing Sheets

(56) References Cited

FOREIGN PATENT DOCUMENTS

| | | |
|---|---|---|
| DE | 25 30 743 | 1/1977 |
| DE | 602004006988 T2 | 2/2008 |
| DE | 102007023249 A1 | 11/2008 |
| DE | 202015105776 U1 | 11/2015 |
| EP | 1 667 862 | 3/2007 |
| JP | S51014908 U | 2/1976 |
| JP | S60199717 A | 10/1985 |

OTHER PUBLICATIONS

International Search Report (in German with English Translation) for PCT/EP2016/072269, dated Feb. 1, 2017; ISA/EP.

* cited by examiner

ROOFTOP-MOUNTED AIR-CONDITIONING INSTALLATION

CROSS REFERENCE TO RELATED APPLICATIONS

This application is a U.S. National Phase Application under 35 U.S.C. 371 of International Application No. PCT/EP2016/072269 filed on Sep. 20, 2016 and published in German as WO 2017/071880 A1 on May 4, 2017. This application claims priority to German Application No. 10 2015 118 557.1 filed on Oct. 30, 2015. The entire disclosures of all of the above applications are incorporated herein by reference.

FIELD

The disclosure relates to a rooftop air-conditioning installation, in particular for a bus roof.

BACKGROUND

Rooftop air-conditioning installations have basically been known for a long time for busses. They usually comprise a condenser unit and one or more evaporator units and communicate with the passenger compartment of the bus by flow technology in order to supply it with fresh air. The supplied air can be heated or cooled by the rooftop air-conditioning installation.

Generic, published prior art has been published, for example as DE 10 2007 023 249 A1 or DE 60 2004 006 988 T2.

Usually, several double radial fans with fan wheels which are curved forward in a completely spiral housing are used in the evaporator units used which transport an air flow in an air flow duct through the heat exchanger into the passenger compartment. The air flow is deflected several times, in particular during the intake, in the radial fan itself, during discharge and when conducted further. This has a negative effect on the efficiency of the air conditioning installation. At the same time the current consumption of the electromotors driving the radial fans rises and with it the fuel consumption of the vehicle.

SUMMARY

Therefore, the disclosure has the problem of making a rooftop air-conditioning installation available whose efficiency, in particular in the evaporator unit, is increased. In addition, a reduced current consumption should be ensured.

According to the disclosure a rooftop air-conditioning installation is suggested especially for a bus roof and which comprises at least one condenser unit and one or more evaporator units. The at least one evaporator unit comprises an air flow duct with an air intake opening and an air discharge opening, wherein a heat exchanger and a radial fan producing a current of air are arranged in the air flow duct between the air intake opening and the air discharge opening. A rotating axle of the fan wheel of the radial fan is aligned parallel to a main air flow direction which extends through the air flow duct from the air intake opening through the heat exchanger to the radial fan.

The air can be taken in by the fan wheel in an axially straight manner and discharged radially in the direction of the passenger compartment without deflection losses. The only deflection takes place in the radial fan. The efficiency of the rooftop air-conditioning installation is therefore increased by an elevation of the efficiency of its evaporator unit(s).

An advantageous embodiment provides that the radial fan or the fan wheel comprises an axial inlet nozzle for taking in the air in an axial direction parallel to the main direction of the air flow. The flow of air in the intake area is additionally accelerated by the nozzle and the efficiency of the radial fan is elevated.

Furthermore, an advantageous embodiment of the rooftop air-conditioning installation provides that the radial fan is arranged adjacent to the air discharge opening of the air flow duct so that an air flow generated by the radial fan can be directly transported in and through the air discharge opening. The air discharge opening frequently forms the air inlet into the connected vehicle. An air duct for distributing the supplied air into certain inflow areas of the inner passenger compartment into which the radial fan is blowing in directly via the air discharge opening can be provided in the roof area of the vehicle.

In this embodiment the heat exchanger, viewed in the direction of flow, is arranged in front of the radial fan in the air flow duct so that the air transported by the radial fan is taken in by the heat exchanger.

It is also advantageous for the efficiency of the rooftop air-conditioning installation if the outside diameter of the radial fan and therefore of the fan wheel are especially large. In an advantageous embodiment the maximum outside diameter of the radial fan corresponds to 80-120%, especially 90-110% of a vertical height of the air flow duct. The radial fan can project here vertically above the air flow duct. In addition, an embodiment is advantageous in which the maximum outside diameter of the fan wheel of the radial fan corresponds to 80-95% of the vertical height of the air flow duct.

In an exemplary embodiment the rooftop air-conditioning installation is characterized in that the rotating axle of the fan wheel runs centrally to the vertical height of the air flow duct. The taken-in flow is then especially homogenous and the same on both vertically opposite inner walls of the air flow duct.

The radial fan is received in a semi-spiral housing in an embodiment which is also advantageous, which housing has at least one open side adjacent to the air discharge opening. The using of completely spiral housings is known from the prior art and in which the fan wheel is surrounded almost completely by the housing and only a discharge opening extending tangentially to the fan wheel is provided. On the other hand, the semi-spiral housing has a completely open side so that the fan wheel is free on the open side, i.e., is not covered by a housing.

A further development provides that the semi-spiral housing at the discharge side has a discharge contour with an air conduction section which has a negative inclination opposite the vertical discharge direction vertically to the main air flow direction. The negative inclination runs on the average at an angle up to −45°. The negative inclination is aligned in such a manner that the air conduction section conducts the air discharge by the radial fan into the adjacent air duct in a direction which is advantageous for the distribution of the air into certain inflow areas of the inner passenger compartment. As a result, the flow which is usually discharged vertically can already experience a guidance in a predetermined direction on the semi-spiral housing, for example, toward the inflow openings into the inner passenger compartment. As a result the counterpressure in the discharge area of the fan wheel is reduced and the efficiency of the radial fan is elevated.

Furthermore, a variant of the rooftop air-conditioning installation provides that the semi-spiral housing projects on the discharge side into the air discharge opening and projects vertically outward opposite the duct housing forming the air flow duct. In particular, even the fan wheel can project with its radial outer area into or over the air discharge opening and can blow the radial air flow directly into a section of the vehicle, for example, the air duct for distributing the supplied air. In addition, the offset of the radial fan in the vertical direction can increase its diameter and therefore its performance. Also, a projecting length of the radial fan and/or of the semi-spiral housing in a vertical direction above the air flow duct can be avoided. This improves the aerodynamics of the rooftop air-conditioning installation.

In addition, a construction in which the semi-spiral housing is formed in one part with a duct housing forming the air flow duct is advantageous as regards the reduced number of parts.

Furthermore, it is advantageous in the solution of the disclosure that the fan wheel comprises backwardly curved fan blades. Compared to traditionally used, forwardly curved fan blades the effectiveness of backwardly curved fan blades is greater.

Furthermore, it is advantageous if the contour of the air conduction section is adapted to the curvature of the backwardly curved fan blades. It is provided to this end that the air conduction section of the radial fan has a curvature in an axial top view which corresponds in its direction to the curvature of the fan blades.

FIGURES

Other advantageous further developments of the disclosure are characterized in the subclaims and are presented in detail in the following together with the description of the preferred embodiment of the disclosure using the FIGs. The figures schematically show by way of example:

DESCRIPTION

Figure 1:
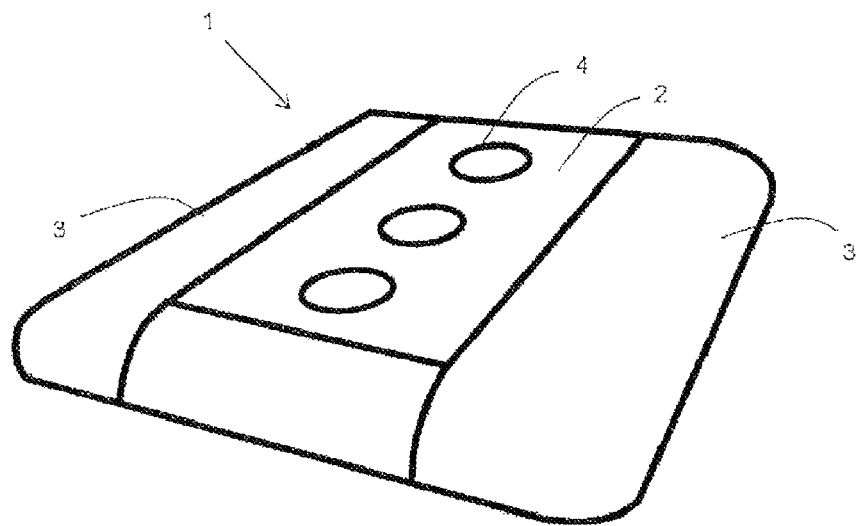
FIG. 1 shows a rooftop air-conditioning installation.

The same reference numerals name the same parts in all views.

FIG. 1 schematically shows in an exemplary manner a rooftop air-conditioning installation 1 for being mounted on a bus and which comprises a condenser unit 2 with three axial ventilators 4 and two evaporator units 3 arranged laterally to the condenser unit 2.

Figure 2:
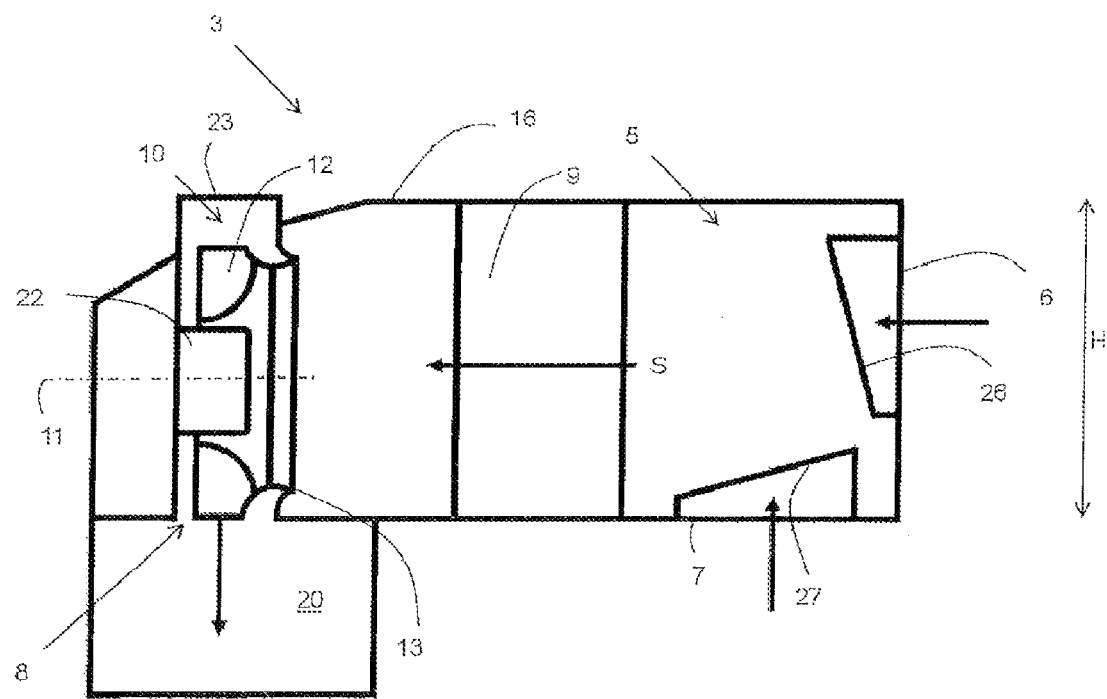
FIG. 2 shows a lateral sectional view of an evaporator unit.

FIG. 2 shows a lateral sectional view of one of the two evaporator units 3 from FIG. 1 which is connected via its air discharge opening 8 and air ducts 20 of a bus for distributing the air supplied from the rooftop air-conditioning installation 1. The evaporator unit 3 comprises the air flow duct 5 formed by a duct housing 16 and with an air intake opening 6 for fresh air and an air intake opening 7 for return air from the inner passenger compartment of the bus. The air intake openings 6, 7 can be closed by flaps 26, 27 so that fresh air and/or return air can be transported. The heat exchanger 9 and the radial fan 10 producing the air flow are arranged in the air flow duct 5 between the air intake openings 6, 7 and the air discharge opening 8. The rotational axle 11 of the fan wheel 12 of the radial fan 10 is arranged parallel to the main air flow direction S of the air flow through the air flow duct 5 and which extends through the air flow duct 5 from the air intake openings 6, 7 through the heat exchanger 9 to the radial fan 10. During operation the radial fan 10 driven by the motor 22 draws fresh air and/or return air in the axial direction through the heat exchanger 9 and blows it in radial direction via the air discharge opening 8 directly into the air duct 20. The radial fan 10 comprises an inlet nozzle 13 and extends in a vertical direction past the vertical height of the air flow duct 5. The outside diameter of the fan wheel 12 corresponds to 90% of the inside width in the vertical height H of the air flow duct 5.

Figure 3:
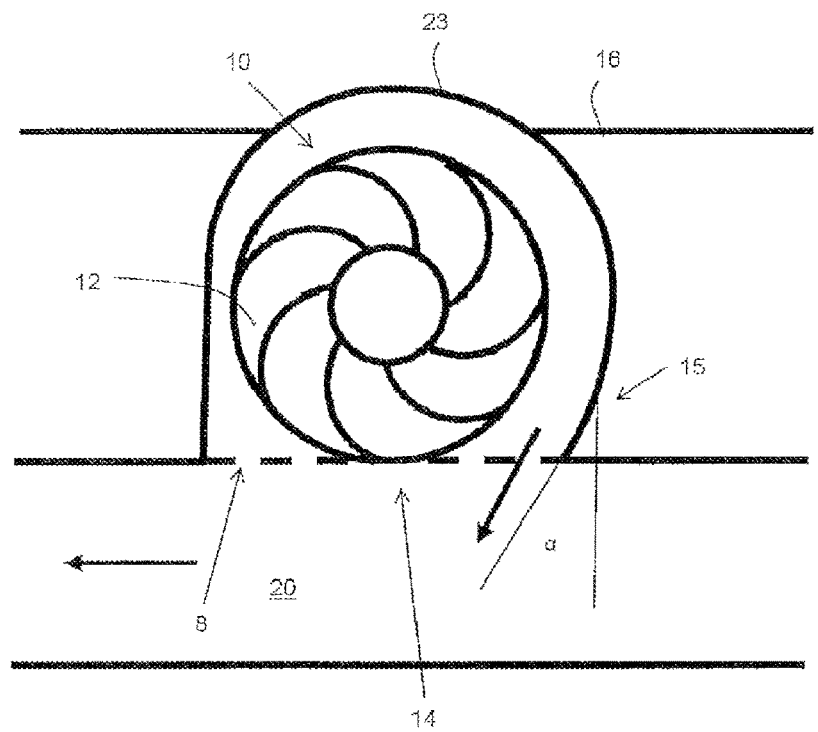
FIG. 3 shows an axial sectional view of the evaporator unit of FIG. 2.

As can be well recognized in the axial section according to FIG. 3, the radial fan 10 is received in its own semi-spiral housing 23 whose lower side 14 facing the air discharge opening 8 and adjacent to it is open. The fan wheel 12 extends to the edge of the air discharge opening 8 and comprises backwardly curved fan blades. The semi-spiral housing 23 projects in the vertical direction above the duct wall 16. It comprises on the discharge side an air conduction section 15 which has a negative inclination with an angle α of about −30° in the embodiment shown opposite the vertical discharge direction vertical to the main direction of air flow. The air conduction section 15 forms the edge section of the radial fan 10. It has in the axial top view according to FIG. 3 a curvature corresponding in its direction to the curvature of the fan blades of the fan wheel 12. The conduction section 15 guides the flow into the air duct 20 in a predetermined direction so that the air does not flow vertically but rather already obliquely partially in a direction to be subsequently determined. An arrow shows the direction of flow of the exemplary embodiment shown in the air duct 20. The fan wheel 12 and the conduction section 15 cooperate directly here as regards the flow technology so that the flow experiences, for being guided further in the air duct 20, a guidance in the subsequent, desired direction already during the discharge of air from the radial fan 10. In the embodiment shown to the left.

Figure 4:
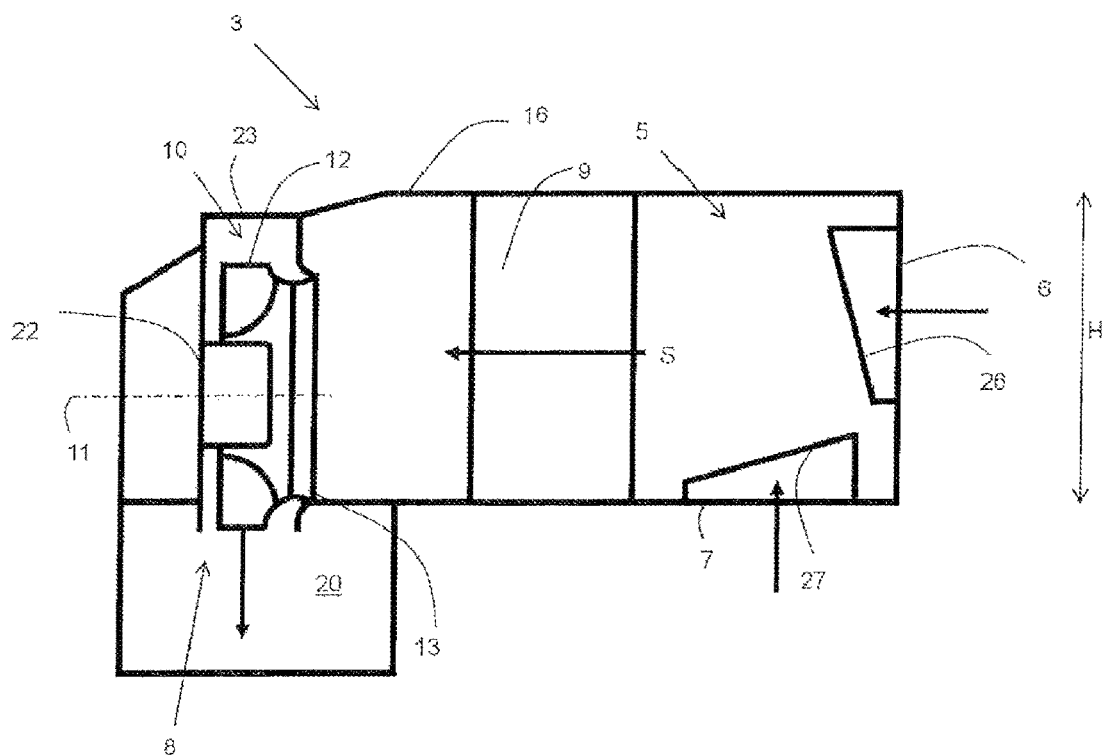
FIG. 4 shows a lateral sectional view of an evaporator unit in an alternative construction.
Figure 5:
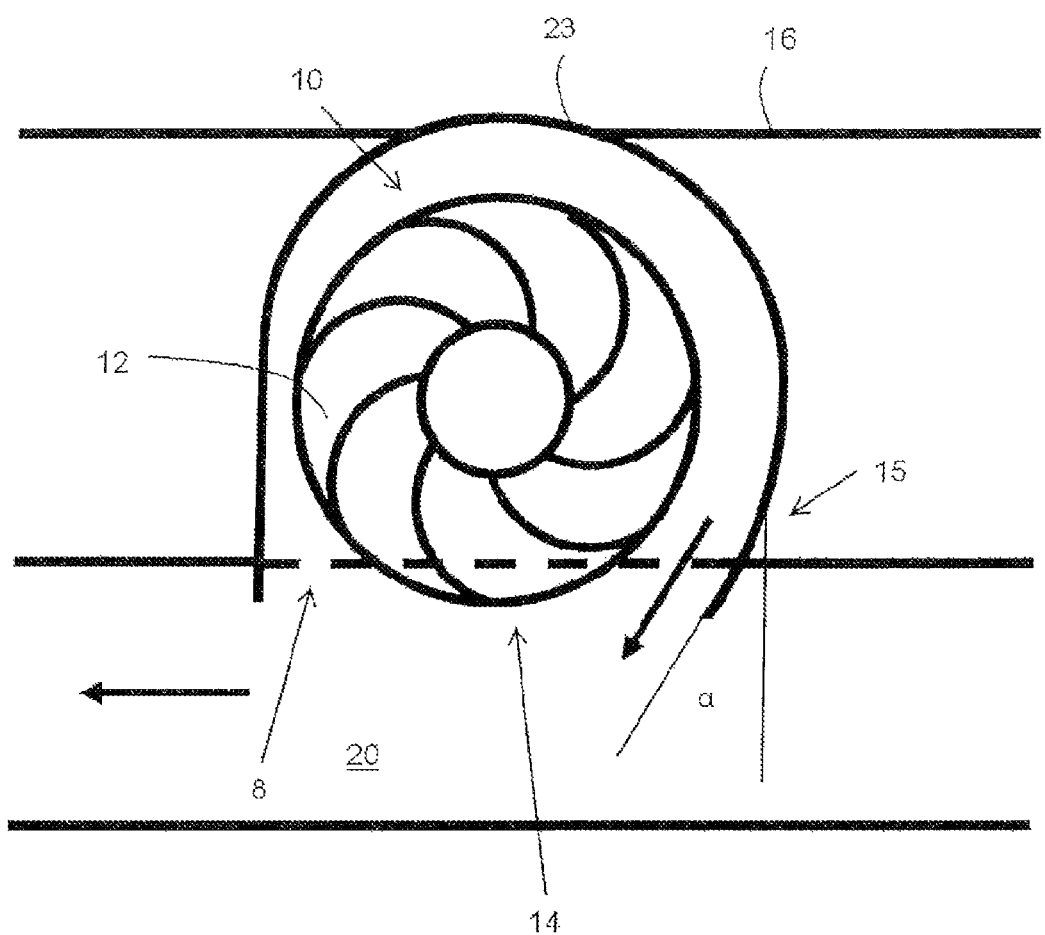
FIG. 5 shows an axial sectional view of the evaporator unit of FIG. 4.

FIGS. 4 and 5 show an alternative exemplary embodiment for the evaporator unit 3 in FIGS. 2 and 3, wherein the features coincide except for the following ones. The radial fan 10 is received in the semi-spiral housing 23 which is, however, positioned offset opposite the duct housing 16 forming the flow duct 5. As a consequence, the semi-spiral housing 23 projects at the top in the vertical direction less far and/or partially not above the duct housing 16. However, on the bottom it projects into the air ducts 20 and projects over the duct housing 16. Even the fan wheel 12 extends with its outermost radial section into the air discharge opening 8 and therefore rotates partially outside of the duct housing 16 in the air duct 20. The entire structure is more compact.

The disclosure is not limited in its construction to the previously indicated preferred exemplary embodiments but rather a plurality of variants are conceivable which make use of the presented solution even in the case of constructions which are basically of a different type. For example, the semi-spiral housing 23 can be integrated into a single part with the duct housing 16.

The invention claimed is:

1. A rooftop air-conditioning installation, comprising,
at least with one condenser unit and one evaporator unit, the evaporator unit including an air flow duct with at least one air intake opening and at least one air discharge opening, wherein a heat exchanger and a radial fan generating an air flow are arranged in the air flow duct between the air intake opening and the air discharge opening, and
a rotational axle of a fan wheel of the radial fan is aligned parallel to a main air flow direction which extends through the air flow duct from the at least one air intake opening through the heat exchanger to the radial fan wherein the fan wheel comprises backwardly curved fan blades and an air conduction section comprises a curvature in an axial top view that corresponds in its direction to the curvature of the fan blades of the fan wheel, the fan wheel fan blades extend to an edge or below the air discharge opening so that air flows already obliquely partially in a determined direction.

2. The rooftop air-conditioning installation according to claim 1, wherein the radial fan of the fan wheel comprises an axial inlet nozzle for taking in air in an axial direction parallel to the main air flow direction.

3. The rooftop air-conditioning installation according to claim 1, wherein the radial fan is arranged adjacent to the air discharge opening of the air flow duct so that an air flow generated by the radial fan is directly transported into the air discharge opening.

4. The rooftop air-conditioning installation according to claim 1, wherein the heat exchanger, viewed in the main air flow direction, is arranged in front of the radial fan in the air flow duct.

5. The rooftop air-conditioning installation according to claim 1, wherein a maximum outside diameter of the radial fan corresponds to 80-120% of a vertical height of the air flow duct.

6. The rooftop air-conditioning installation according to claim 1, wherein a maximum outside diameter of the fan wheel of the radial fan corresponds to 80-95% of a vertical height of the air flow duct.

7. The rooftop air-conditioning installation according to claim 1, wherein the rotating axle of the fan wheel runs centrally to a vertical height of the air flow duct.

8. The rooftop air-conditioning installation according claim 1, wherein the radial fan is received in a semi-spiral housing.

9. The rooftop air-conditioning installation according to claim 8, wherein the semi-spiral housing has at least one open side adjacent to the air discharge opening.

10. The rooftop air-conditioning installation according to claim 8, wherein the semi-spiral housing at a discharge side has a discharge contour with an air conduction section which has a negative inclination opposite a vertical discharge direction vertically to the main air flow direction.

11. The rooftop air-conditioning installation according to claim 10, wherein the negative inclination runs on an average at an angle up to −45°.

12. The rooftop air-conditioning installation according to claim 8, wherein the semi-spiral housing projects on a discharge side into the air discharge opening and projects opposite a duct housing forming the air flow duct.

13. The rooftop air-conditioning installation according to claim 8, wherein the semi-spiral housing is formed in one part with a duct housing forming the air flow duct.

* * * * *